United States Patent [19]

Melchior

[11] 4,351,290
[45] Sep. 28, 1982

[54] INTERNAL COMBUSTION ENGINE WITH IMPROVED EFFICIENCY AND FILLING BY RECOVERY OF PART OF THE ENERGY OF THE BLASTS WHICH ARE PRODUCED DURING THE OPENING OF THE EXHAUST PORTS

[76] Inventor: Jean Melchior, 66, Boulevard Maurice Barrès, 92200 Neuilly-sur-Seine, France

[21] Appl. No.: 92,626

[22] Filed: Nov. 8, 1979

[30] Foreign Application Priority Data

Nov. 9, 1978 [FR] France ............................ 78 31730

[51] Int. Cl.³ .................................................. F02B 33/44
[52] U.S. Cl. ............................ 123/59 BM; 123/559; 60/606
[58] Field of Search .............. 123/59 R, 59 BM, 559; 60/605, 606

[56] References Cited

U.S. PATENT DOCUMENTS

| | | | |
|---|---|---|---|
| 1,700,391 | 3/1929 | Benjamin | 123/559 |
| 3,800,763 | 4/1974 | Pouit | 123/559 |
| 3,988,894 | 11/1976 | Melchior | 60/606 |
| 3,996,747 | 12/1976 | Melchior | 60/606 |
| 4,009,574 | 3/1977 | Melchior | 60/606 |
| 4,026,115 | 5/1977 | Melchior et al. | 60/606 |
| 4,125,999 | 11/1978 | Melchior | 60/606 |

FOREIGN PATENT DOCUMENTS 421110 12/1934 United Kingdom ................ 60/606

*Primary Examiner*—Craig R. Feinberg

[57] ABSTRACT

The invention uses the supersonic blast occurring when the exhaust is opened in an internal combustion engine having a variable volume combustion chamber.

A transfer conduit is provided between the exhaust pipe and the intake pipe, the volume of this conduit being greater than the cubic capacity of the cylinder, as well as a supply channel and a discharge channel, of a smaller section than the conduit, between this latter and the combustive air intake manifold and the burnt gas exhaust manifold.

The invention applies principally to supercharged diesel engines with low compression rate.

9 Claims, 13 Drawing Figures

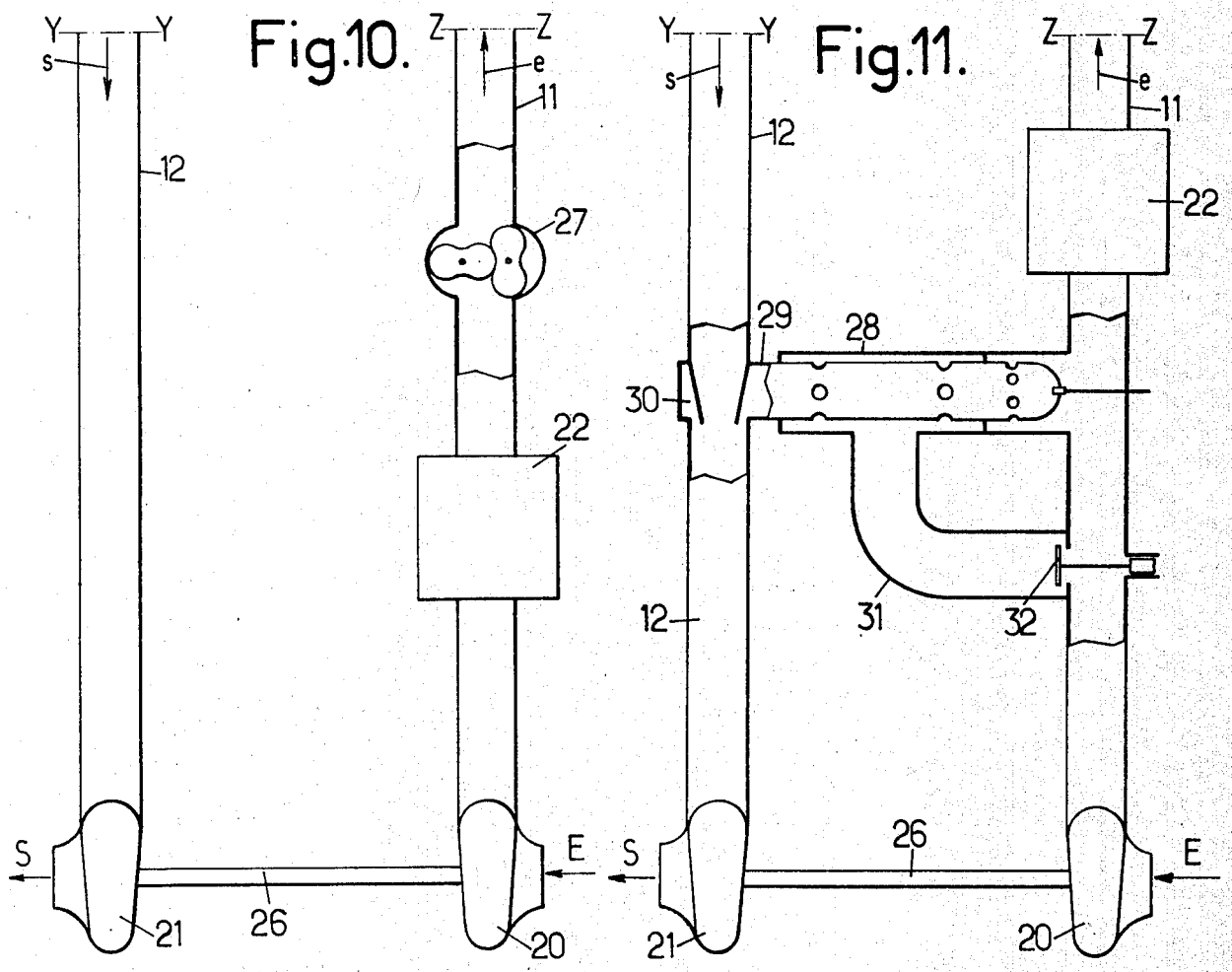

INTERNAL COMBUSTION ENGINE WITH IMPROVED EFFICIENCY AND FILLING BY RECOVERY OF PART OF THE ENERGY OF THE BLASTS WHICH ARE PRODUCED DURING THE OPENING OF THE EXHAUST PORTS

The present invention relates to internal combustion engines having a variable volume combustion chamber, not only of the reciprocating type but also of the rotary type. It is particularly, but not exclusively, appropriate for supercharged engines.

It can be applied as well to engines of the diesel type, i.e. with ignition by compression, as to engines with controlled ignition fed with a fuel-combustive gas mixture, called in practice "explosion engines", whether these two types of engine are two- or four-stroke.

The invention aims at improving the efficiency and the filling of such an engine by recovering part of the energy of the blasts which are produced during the opening of the exhaust port, particularly of an exhaust valve or aperture, of each cylinder of the engine. It has also the advantage of reducing the noise of the engine.

It is in fact known that the opening of an exhaust port of an internal combustion engine cylinder releases an energy-bearing supersonic blast; this energy is all the greater the lower the expansion rate of the gases in the cylinder, which is the case with low-compression engines, such as supercharged low-compression diesel engines.

It has been suggested using the energy of this blast to raise the pressure in the air intake manifold of an engine. In particular a process is known, called the Comprex process, for supercharging a diesel engine by compressing the air, before its admission into a cylinder, by means of the exhaust gases. This process, described for example in a document of the "Society of automotive engineers" of Detroit (Mich., U.S.A.), titled "Comprex supercharging of vehicle diesel engines", dated Feb. 24-28, 1975 and having as author Mr. Peter K. Doerflan, uses a rotary member formed by an elongated cylinder separated into several elongated compartments, which are distributors for the exhaust gases, on the one hand, and the combustive air, on the other, between the inlet ports, the outlet ports, the air intake manifold at substantially atmospheric pressure and the gas exhaust manifold at substantially atmospheric pressure, the pressure of the exhaust gases at the outlet of the exhaust ports being transferred, in this rotary member, to the air before its arrival at the inlet ports.

This known process requires this rotary member to be driven in rotation (in practice this drive, which must be synchronized with that of the pistons of the engine, is provided from the crankshaft of the engine) and sealing means between the compartments of hot burnt gases and fresh air, which are at different pressures in said rotary member.

It has moreover been proposed U.S. Pat. No. 3,800,763 of Mr. Robert Jean Pouit), in internal combustion engines of the explosion type, having several cylinders, to connect the exhaust of each cylinder to the inlet of another cylinder shifted in phase by a half-cycle of operation of the engine, in relation to the first cylinder, by means of a one-way pipe; with this arrangement, the depression which follows the exhaust blast of the first cylinder accelerates by suction the inlet air of the second cylinder. It will be noted that this pipe has a reduced volume, smaller than the volume of each cylinder, and that the air travels therethrough in a single direction only, without the exhaust blast ever penetrating therein. The pipe serves essentially in this American patent for transmitting the depression which follows the blast, from the exhaust side of a first cylinder to the suction side of a second cylinder, which accelerates the intake of carburetted air into this first cylinder while supercharging it.

The present invention, on the other hand, uses directly the exhaust blast of an internal combustion engine cylinder of any type, for compressing the inlet air (possibly carburetted) of the same cylinder or of another cylinder of the engine without using any rotary member as in the Comprex process, but by means of an entirely static transfer conduit connected between the exhaust pipe of a cylinder and the inlet pipe of the same cylinder or of another cylinder of the engine, this conduit having a volume at least equal to that of the cylinder and communicating through passages with the intake and exhaust manifolds of the engine so that, during one period of the operating cycle of the engine, there may pass therethrough the air coming from the intake manifold which will be directly forced into the cylinder, contrary to what happens in the engine according to the above-mentioned American patent.

More precisely, the invention has as its aim an internal combustion engine comprising at least one work chamber, particularly a cylinder, with an intake pipe for the intake of air, possibly carburetted, into the work chamber and an exhaust pipe for discharging burnt gases from the work chamber, an air intake manifold for the engine and a manifold for exhausting the burnt gases from the engine, characterized by the fact that it comprises, in combination, a transfer conduit connecting directly the exhaust pipe of one work chamber to the intake pipe of the same work chamber or of another work chamber of the engine, the volume of said conduit being at least equal to that of said work chamber or of each of said work chambers, and two passages communicating said conduit with each of said manifolds, i.e. an exhaust passage in the vicinity of said exhaust pipe and an intake passage in the vicinity of said intake pipe, the flow permeability from the intake manifold towards the exhaust manifold through said intake passage, said conduit and said exhaust passage in series allowing, in operation, the substantially complete discharge towards the exhaust manifold of the burnt gases produced during the preceding cycle in the work chamber and forced into this conduit from the exhaust pipe of this chamber and the replacement of these gases by air, possibly carburetted, coming from the intake manifold, during the period of the cycle during which said exhaust pipe and said supply pipe are substantially isolated from the chamber or the chambers with which they are associated.

It will be noticed that, in accordance with the invention, the pressure wave of the exhaust blast is transferred directly, by means of a transfer conduit, as far as the intake port of the same cylinder or of a different cylinder, and this without using any distributing rotary member, contrary to the Comprex system in which the transfer conduits are isolated, during the pressure exchange phases, from the supply manifolds (atmospheric or enclosure already supercharged) and from the exhaust manifolds (atmospheric or under supercharging pressure in front of the turbine).

According to the present invention the transfer channel communicates permanently with the intake and exhaust manifolds. Thus, the instantaneous pressure rise is limited to the amplitude of the pressure wave of the exhaust blast and could not form a high-pressure supercharging device.

Nevertheless this pressure wave is sufficiently efficient to accelerate the passage of the air through the intake ports of the engine.

This overpressure aids in filling the engine (during the scavenging phase for a two-stroke engine and during the induction phase of a four-stroke engine with, in this case, the benefit of positive operation of the piston during this intake).

The invention, furthermore, due to this collecting by the cylinder of the exhaust waves, limits the sound radiation and provides the engine with an appreciably silent operation.

The invention will, in any case, be well understood with the help of the complement of description which follows, as well as the accompanying drawings, which complement and drawing are, of course, given especially by way of indication.

FIGS. 10 and 11 illustrate the application of the arrangement of FIGS. 7 to 9 to turbocompressor supercharged engines.

Figure 12:
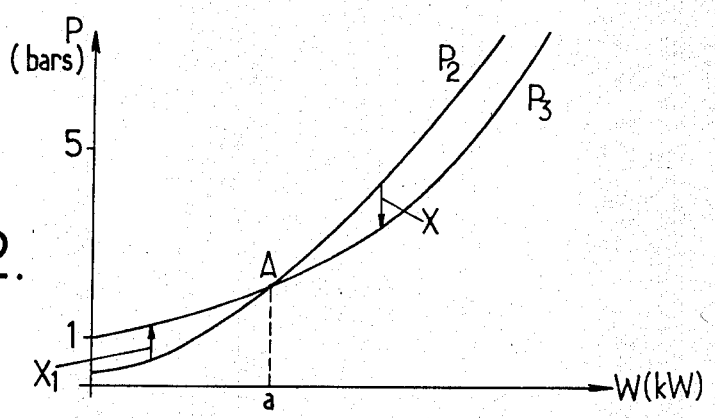

FIG. 12, finally, is a diagram showing the trend of the variations of the absolute pressure P (shown as ordinates) reigning in the intake manifold (curve $P_2$) and the exhaust manifold (curve $P_3$), as a function of the power W (shown as abscissa) of an engine supercharged by turbocompressor on exhaust gases.

According to the invention and more especially according to that one of its modes of application, as well as according to those of the embodiments of its different parts, to which it seems preference should be given, desiring for example to construct a device adapted to use the blast generated during the opening of an exhaust port, such as an exhaust valve or aperture, of an internal combustion engine, the following or similar is the way to set about it.

Figure 1:
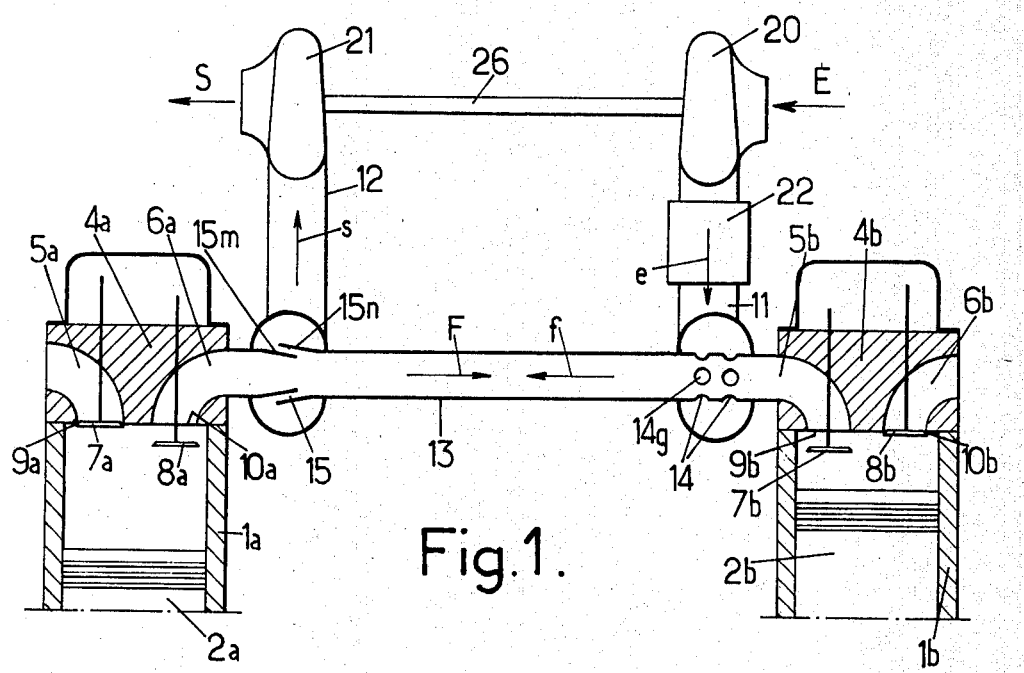
FIG. 1 illustrates the principle of the invention applied to an internal combustion engine comprising at least two cylinders with valves, supercharged by a turbocharger, the transfer conduit connecting the exhaust pipe of a first cylinder to the intake pipe of a second cylinder.

Reference is first of all made to FIG. 1 on which there is shown schematically and in section:

the upper part of two cylinders 1a, 1b of an internal combustion engine having at least two cylinders, the upper part of piston 2a, 2b reciprocating in the cylinder respectively 1a, 1b, the cylinder head 4a, 4b of each cylinder 1a, 1b respectively, the intake 5a and exhaust 6a pipes of cylinder 1a and the intake 5b and exhaust 6b pipes of cylinder 1b, the intake 7a and exhaust 8a valves of cylinder 1a, adapted to close and open, according to their position, the intake 9a and exhaust 10a openings respectively of cylinder 1a, the intake 7b and exhaust 8b valves of cylinder 1b, adapted to close and open, according to their position, the intake 9b and exhaust 10b openings respectively of cylinder 1b, these valves 7a, 8a, 7b, 8b being actuated by a camshaft (not shown) in a way known per se, a manifold 11 for the intake or admission of combustive air, carburetted in the case of a so-called explosion type engine, a manifold 12 for removing the exhaust gases or burnt gases.

In the case illustrated in FIG. 1, i.e. of an engine supercharged by turbocompressor, the exhaust gases which pass through manifold 12 in the direction of arrow s rotate the rotor of a turbine 21 before escaping as shown by arrow S. This turbine rotor drives through shaft 26 the rotor of a compressor 20 which receives the atmospheric air, as shown by arrow E, and compresses it. The compressed air flows in the direction of arrow e through the intake manifold 11; it is generally cooled by a cooling device 22 which compensates for the heating due to the compression and increases the specific weight of the air.

In a supercharged compression engine of the prior art, manifold 11 supplies directly intake pipe 5b, whereas exhaust pipe 6a feeds directly the exhaust gases into manifold 12.

In accordance with the invention, there is provided a transfer conduit between exhaust pipe 6a of cylinder 1a and the intake pipe 5b of cylinder 2a, the volume of this conduit being, for reasons outlined above, at least equal to the volume of cylinders 1a, 1b; furthermore, the section of the transfer conduit 13 is preferably close to that of exhaust pipe 6a.

There is furthermore provided, between this transfer conduit 13 and the exhaust 12 and intake 11 manifolds, exhaust 15 and intake 14 passages respectively, having a reduced section in relation to the section of said transfer conduit and of said manifolds, so as to reduce to a minimum radiation towards the manifolds 11 and 12 of the blast wave which occurs when the exhaust valve 8a of cylinder 1a opens and which passes through conduit 13; however the flow permeability of the fluids from the intake manifold towards the exhaust manifold successively through the intake passage, said conduit and the exhaust passage in series, is sufficient to allow the substantially complete discharge, towards the exhaust manifold 12, of the combustion gases produced during a cycle of cylinder 1a and discharged into said conduit during the period when valve 8a is open, and the replacement of these combustion gases by fresh air coming from manifold 11, during the period of the cycle of the engine during which the transfer conduit 13 is isolated from cylinders 1a and 1b, valves 8a and 7b being substantially closed.

Said passages may be provided in different ways.

Figure 1A:
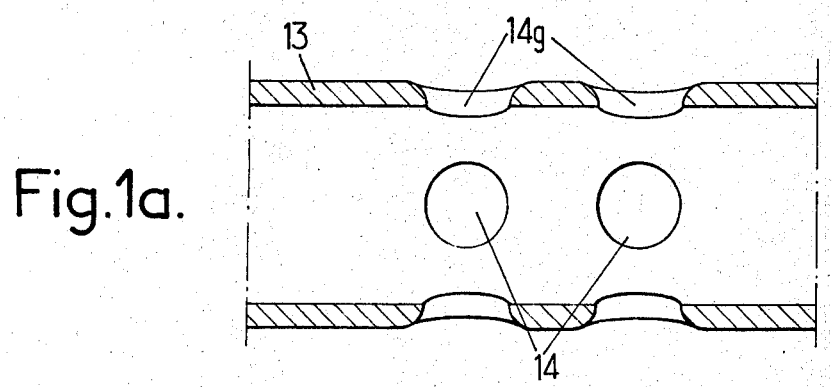
FIG. 1a illustrates, on a larger scale, the shape of the holes forming the passages between the intake manifold and the transfer conduit in the engine of FIG. 1.

In the case of FIG. 1, exhaust passage 15 is formed by the annular space between two cones or convergent portions (in the direction of arrow F) 15m and 15n fitted one into the other with clearance, whereas the intake passage 14 is formed by holes 14g, which are illustrated on a larger scale in FIG. 1a which shows a preferred embodiment promoting the passage of gaseous fluids from the intake manifold to the transfer conduit with respect to the passage thereof in the opposite direction.

The operation of an internal combustion engine having at least cylinders 1a and 1b with the system equipped with the improvements of the invention shown in FIG. 1 will now be described. It will be assumed that it is a two-stroke motor, of the diesel type or of the so-called "explosion" type.

For the description of the operation which follows, there will be taken, as origin of the angles of the crankshaft and as origin of the strokes, top dead-center, corresponding to the combustion, in cylinder 1a.

The power stroke in cylinder 1a, with the two valves 7a and 8a closed, takes place between the point of origin (crankshaft angle 0°) and a position of piston 2a somewhat above bottom dead-center for example at 130°, when the exhaust valve 8a opens.

There reigns at that time inside cylinder 1a a pressure, for example of the order of 15 bars, which is distinctly greatly than the pressure which reigns at that moment in transfer conduit 13, for the example of the order of 4 bars. Thus, a supersonic blast passes from inside cylinder 1 into transfer conduit 13, in the direction of arrow F, pushing before it the mass of fresh air which is present therein and sucking in, because of the depression which follows the supersonic pressure wave, burnt gases from inside cylinder 1a. The pressure wave arrives at the intake valve 7b of cylinder 1b a little later (the time, expressed as a crankshaft angle, which the wave takes to travel, in the direction of arrow F, through transfer conduit 13 from the exhaust valve 8a to the intake valve 7b depending on the length of the transfer conduit 13, on the speed of rotation of the engine and on the speed of sound in the gases present in this conduit). Meanwhile, a part of the burnt gases from cylinder 1a has penetrated into conduit 13 compressing the combustive air which is initially present therein (angle of 130° of the crankshaft). The rest of the burnt gases is discharged from the cylinder 1a by scavenging with fresh air, possibly carburetted, arriving in intake pipe 5a through another transfer conduit (not shown) connected to this pipe 5a, as explained hereafter for scavenging cylinder 1b.

The pressure wave arrives at intake valve 7b which has just opened, for example for an angle of the crankshaft of 155°. Thus, the fresh air initially contained in conduit 13 penetrates into cylinder 1b pushing out by scavenging the rest of the burnt gases which are present in this cylinder, these burnt gases following the transfer conduit (not shown) connected to exhaust pipe 6b.

Because the expansion of the pressure wave in cylinder 1b is used, the scavenging of the burnt gases is considerably accelerated, which allows the duration of the scavenging to be reduced and the two valves 8a and 7b to be closed for example at about 240°.

When these two valves are closed, transfer conduit 13 is isolated from cylinders 1a and 1b. Since the pressure of the air in manifold 11 is greater than the pressure of the gases in manifold 12, conduit 13 is scavenged and the burnt gases which are present therein are replaced by air possibly carburetted, the air arriving under pressure through passage 14 formed by holes 14g, flowing in conduit 13 in the direction of arrow f and pushing back the burnt gases which leave this conduit, through passage 15 between cones 15m and 15n, to reach the exhaust manifold 12 from where they pass to the turbine 21 (arrow s).

It can be seen that there remains about 250° of rotation of the crankshaft to achieve this scavenging of the burnt gases in conduit 13 and their replacement by fresh air.

Then a new cycle can begin with the opening of exhaust valve 8a of cylinder 1a.

As we have seen, the exhaust pipe 6b of cylinder 1b is connected by a transfer conduit to the intake pipe 5a of cylinder 1a, or to the exhaust pipe of another cylinder of the engine.

Thus we see that passages 15 and 14 must allow the diffusion of only the smallest possible fraction of the pressure wave moving, in the direction of arrow F, in conduit 13 between the exhaust opening 10a, when valve 8a opens, and the intake opening 9b, valve 7b having closed, so that this wave is best used for scavenging cylinder 1b.

On the other hand, passage 14 must allow compressed fresh air to pass from the intake manifold 11 to the transfer conduit 13, whereas passage 15 must allow the burnt gases (coming from cylinder 1a) to pass from this transfer conduit 13 (flowing in the direction of arrow f under the effect of fresh compressed air arriving through passage 14) towards the exhaust manifold 12.

Holes 14g are preferably particularly adapted (shape illustrated in FIG. 1a) to form a one-way passage 14 (little diffusion of the pressure wave and the gases—air or burnt gases—from 13 towards 11, but a relatively easy passage of the compressed fresh air from 11 towards 13); similarly the structure with two cones 15m, 15n fitted one in the other with peripheral clearance forming passage 15 presents a flow permeability of the transfer conduit 13 towards exhaust manifold 12 which is low when the exhaust gases are flowing in this conduit in the direction of arrow F, but which is high when the exhaust gases and the air flow in this conduit in the direction of arrow f.

Figure 6:
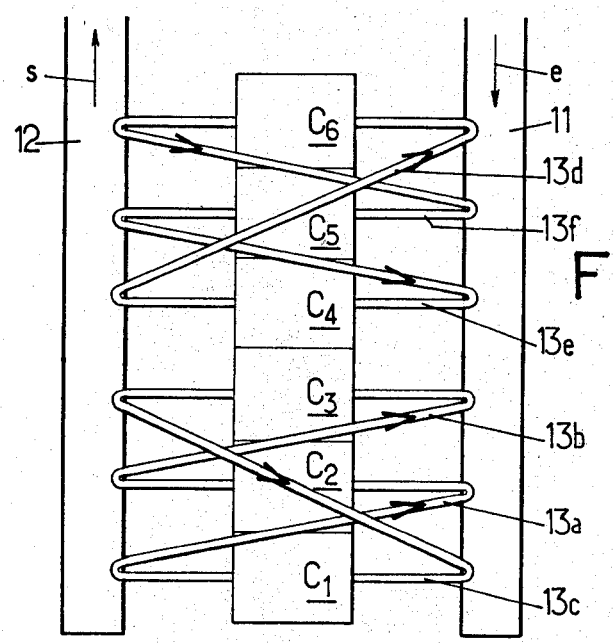

The device illustrated in FIG. 1 and using the improvements of the invention may also be applied to the case of a four-stroke engine, for example a six-cylinder in-line engine (as illustrated in FIG. 6) in which the connected cylinders are out of phase by 240°, the order of firing being 1, 5, 3, 6, 2, 4.

If we also take as origin of the strokes the combustion top dead-center of cylinder 1a, lagging by 240° behind cylinder 1b, the expansion in cylinder 1a will take place between 0° and 140°.

At 140°, the exhaust valve 8a of cylinder 1a opens, which creates a pressure wave which reaches through transfer conduit 13 (in the direction of arrow F) cylinder 1b, for example at 180°, i.e. in the middle of its induction stroke (for this cylinder) when piston 2b is close to its maximum speed. The pressure wave invades cylinder 1b and creates useful work which increases the effective average pressure in this cylinder and reduces the specific consumption.

The induction stroke then becomes a power stroke.

After the exhaust valve 8a of cylinder 1a and intake valve 7b of cylinder 1b have closed, the replacement of the burnt gases present in transfer conduit 13 takes place as in the case of a two-stroke engine, with flow in conduit 13 in the direction of arrow f.

We have seen that, both for a four-stroke engine and for a two-stroke engine, the volume of conduit 13 must be at least equal to the cubic capacity of a cylinder, so that it contains enough air for supplying a cylinder.

It may be noted that the transfer of energy from the burnt gases coming from cylinder $1a$ to the fresh air for cylinder $1b$ takes place through the mechanism of a gaseous piston with good efficiency and a minimum of mixing.

In the case of a four-stroke engine, the time available for scavenging the transfer conduit is about 540° in the crankshaft.

Figure 2:
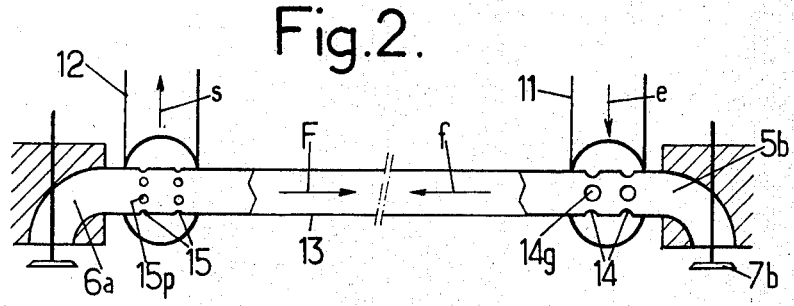
FIGS. 2 to 4 show variations of the part of FIG. 1 provided with the improvements of the invention, the modifications relating to embodiments of the passages between the intake and exhaust manifolds, on the one hand, and the transfer conduit, on the other hand.
Figure 3:
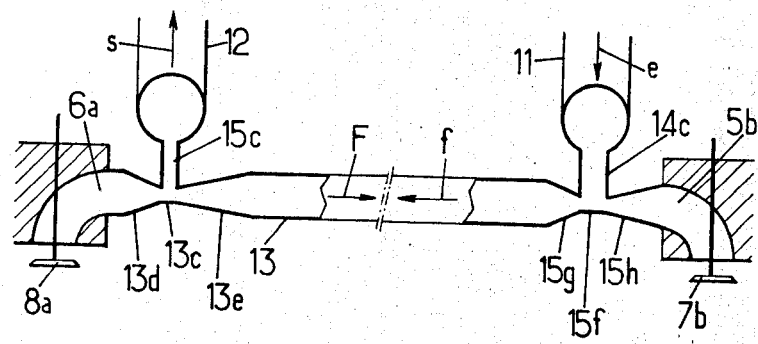
Figure 4:
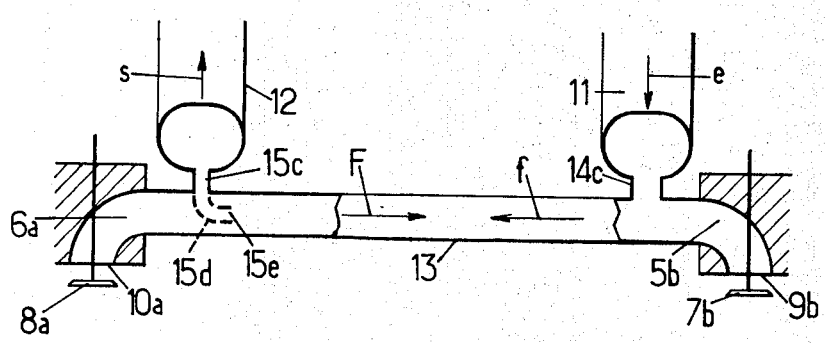

In FIGS. 2 to 4 there are shown variations of the exhaust 15 and intake 14 passages:

in the case of FIG. 2, these two passages are formed by means of holes, i.e. exhaust holes $15p$ having a smaller diameter than the intake holes $14g$;

for FIG. 3, there is provided for the exhaust passage a channel $15c$ connecting the exhaust manifold 12 to a narrowed portion $13c$ of conduit 13, this portion forming the neck of a venturi, channel $15c$ having a small section with respect to that of conduit 13 and manifold 12; it is known that in the highly converging part $13d$ (in direction F) of the venturi the pressure wave, produced by the opening of valve $8a$, is transformed into speed, the speed of the burnt gases passing through (in the direction of arrow F) being maximum in the region of neck $13c$, resulting in low diffusion towards manifold 12 through channel $15c$ which has furthermore a reduced section; on the other hand, the divergent portion $13e$ (in direction F) is longer, which allows the speed of the burnt gases to be retransformed into pressure;

still with the case of FIG. 3, the intake passage is also formed by a channel $14c$ having a section smaller than that of conduit 13 and manifold 11, but greater than that of exhaust channel $15c$, so as to allow the fresh compressed air to pass relatively easily from manifold 11 to conduit 13, while limiting diffusion from this conduit to manifold 11 when air or burnt gases pass through neck $15f$ of venturi $15g$–$15h$ similar to venturi $13d$–$13e$ (converging portion $15g$ shorter than the diverging section $15h$, the notions of convergent and divergent corresponding to a flow in the direction F);

in the case of FIG. 4, there are also provided channels $15c$ and $14c$ for forming the passages, channel $14c$ having possibly a section larger than that of channel $15c$; these two channels $15c$ and $14c$ have sections less than those of manifolds 12 and 11 respectively; on the other hand transfer conduit 13 has a uniform section without necks; in order to reduce diffusion from conduit 13 to manifold 12, when the flow in the conduit is in direction F, without reducing diffusion too much when the flow in this conduit is in direction f, an extension is provided, inside conduit 13, of channel $15c$, this extension $15e$ comprising a bend $15d$ and with its end directed in direction F, as illustrated with dash lines in FIG. 4.

Figure 5:
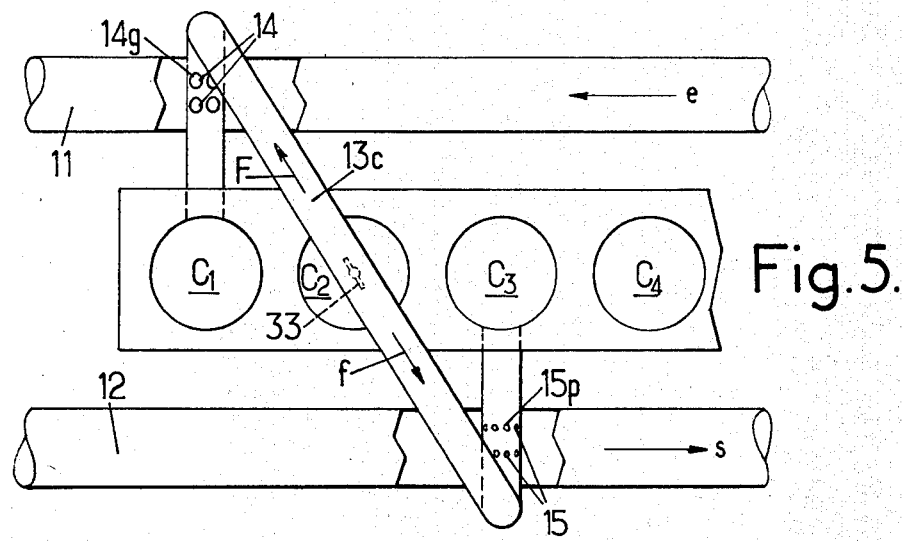
FIGS. 5 and 6 illustrate the application of the invention to a four-stroke six-cylinder engine, the transfer conduits connecting the exhaust pipe and the intake pipe of two different cylinders of the engine.

In FIGS. 5 and 6 there is shown schematically an engine having six cylinders $C_1$, $C_2$, $C_3$, $C_4$, $C_5$, $C_6$ with firing order $C_1$, $C_5$, $C_3$, $C_6$, $C_2$, $C_4$, then again $C_1$, $C_5$, $C_3$ . . . , with six transfer conduits: $13a$ between the exhaust pipe of cylinder $C_1$ and the intake pipe of cylinder $C_2$, $13b$ between the exhaust pipe of cylinder $C_2$ and the intake pipe of cylinder $C_3$, $13c$ between the exhaust pipe of cylinder $C_3$ and the intake pipe of cylinder $C_1$, $13d$ between the exhaust pipe of cylinder $C_4$ and the intake pipe of cylinder $C_6$, $13e$ connecting the exhaust pipe of cylinder $C_5$ to the intake pipe of cylinder $C_4$ and finally $13f$ connecting the exhaust pipe of cylinder $C_6$ to the intake pipe of cylinder $C_5$.

Passages 14 and 15 between each transfer conduit, such as $13a$ and the intake and exhaust manifolds, respectively, may be formed by holes $14g$ having a relatively large section and by holes $15p$ having a relatively small section, respectively (FIG. 5).

In FIG. 6 the passages between transfer conduits $13a$ and $13f$ and the intake 11 and exhaust 12 manifolds have not been shown.

The operation is the same, for each transfer conduit of FIGS. 5 and 6, as that described with reference to FIG. 1 for a four-stroke engine.

There will now be described, with reference to FIGS. 7 to 11, the implementation of the invention in the case where the transfer conduit of the invention connects the exhaust pipe of one cylinder to the intake pipe of the same cylinder.

Figure 7:
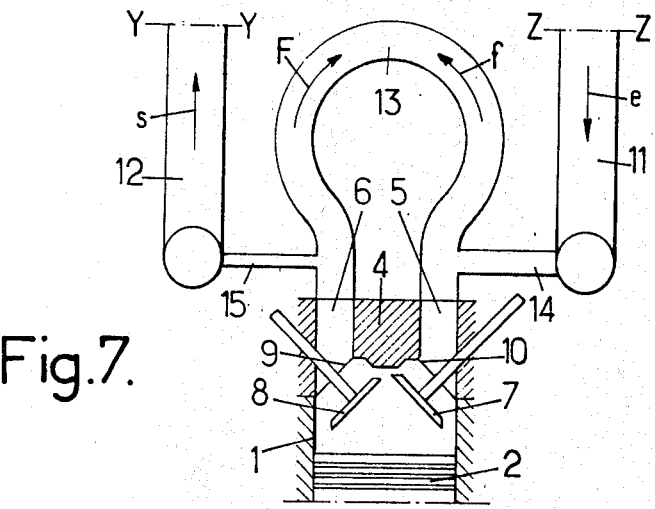
FIGS. 7, 8 and 9 show a two-stroke engine cylinder, the transfer conduit connecting the exhaust and intake pipes of this cylinder, these three figures corresponding to the case of an engine with valves (FIG. 7), of an engine with an exhaust valve and single-current scavenging intake ports (FIG. 8) and of an engine with looped scavenging exhaust and intake ports (FIG. 9) respectively.

In FIG. 7 there is shown the application of the invention to one of the cylinders of a two-stroke valve engine of the type described and illustrated in the French Patent Application No. 2,338,385 filed on Jan. 15, 1976.

In this figure piston 2 moves in a cylinder 1 having an intake valve 7 and an exhaust valve 8, both inclinably disposed, as described in the above-mentioned patent application.

In accordance with the invention, a transfer conduit 13 connects exhaust pipe 6 to the intake pipe 5 of cylinder 1. Furthermore, intake passages, formed by a channel 14 having a relatively large section (but more reduced than that of conduit 13 and intake manifold 11), and exhaust passages, formed by a channel 15 having a relatively small section (smaller than that of channel 14), connect conduit 13 to the intake 11 and exhaust 12 manifolds.

The operation of the system of FIG. 7 will now be described, taking as origin of the angles of the crankshaft and as origin of the strokes top dead-center corresponding to combustion in cylinder 1.

The explosion stroke in cylinder 1, with valves 7 and 8 closed, takes place between the stroke origin (top dead-center) and a position of piston 2 somewhat above bottom dead-center, for example at 130° when exhaust valve 8 opens.

At this time a supersonic blast escapes from inside cylinder 1 and through exhaust pipe 6 reaches transfer conduit 13 while displacing, in the direction of arrow F, the column of air contained in this conduit and while sucking in, because of the depression which follows the supersonic pressure wave, burnt gases from inside cylinder 1.

The intake valve 7 opens, for example for a crankshaft angle of 155°, and fresh air, possibly carburetted, contained in conduit 13 penetrates into cylinder 1 through opening 10 and pushes out by scavenging the rest of the burnt gases which are present in this cylinder, these gases leaving the cylinder through exhaust opening 9, valve 8 being still open, and reach conduit 13. It can be seen that the volume of this latter must be at least equal to that of cylinder 1 so that practically all the burnt gases from this latter may be stocked in the conduit during this phase of the operating cycle of cylinder 1; if the volume of conduit 13 were smaller than that of cylinder 1, a part of the burnt gases would be returned to the cylinder through conduit 13 and the scavenging of the cylinder would not be efficiently accomplished.

Then valves 7 and 8 close, which isolates transfer conduit 13 from cylinder 1. The air under pressure from manifold 11, possibly carburetted, reaches through the channel or passage 14 conduit 13 and pushes back the burnt gases contained therein towards exhaust manifold 12 through channel or passage 15 smaller in section than channel or passage 14. This achieves the scavenging of conduit 13 (in the direction of arrow f) which is rid of the burnt gases. After this scavenging, conduit 13 is again filled with fresh air and a new cycle may begin again.

Figure 8:
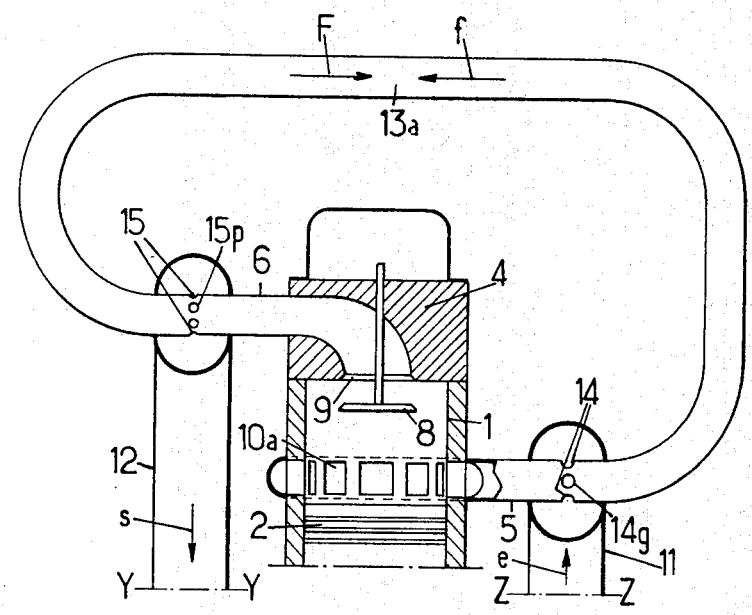

The embodiment of FIG. 8 is similar to that of FIG. 7, except that the intake, instead of being controlled by the opening of an intake valve 7, is provided by intake ports 10a which are uncovered at a specific moment in the cycle by piston 2 during its downward stroke (power stroke) and are covered over again at another specific moment by this piston during its upward stroke (compression stroke). Furthermore, passages 14 and 15 are formed by apertures 14g having a relatively large section and 15p having a relatively small section.

The operation of the embodiment of FIG. 8 is similar to that of FIG. 7.

Figure 9:
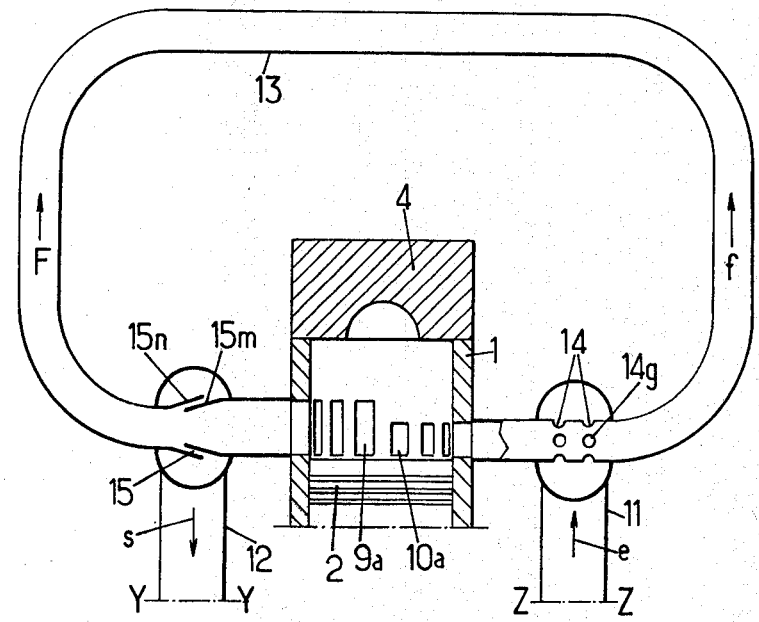

The embodiment of FIG. 9 is similar to that of FIG. 7, except that the intake and exhaust, instead of being controlled by valves 7 and 8, are provided by intake ports 10a and exhaust ports 9a which are uncovered at specific moments in the cycle by piston 2 in its downward power stroke and are covered over again at other specific moments by this piston in its upward compression stroke. Furthermore, passages 14 and 15 are formed by apertures 14g (as in the case of FIG. 8) and by a system of two converging portions 15m and 15n fitted one in the other between which exist an annular passage 15 (passages 14 and 15 are then constructed as in FIG. 1).

The operation of the embodiment of FIG. 9 is similar to that of the embodiments of FIGS. 7 and 8.

Beyond lines YY and ZZ of the embodiments of FIGS. 8 and 9, and also of FIG. 7, there may be provided, in the case of a supercharged engine, the fitment of FIG. 10 or that of FIG. 11.

In these figures we find again the turbine 21-compressor 20 assembly whose rotors are fixed to a common shaft 26, the turbine receiving the burnt gases (arrow s) which expand therein before leaving (arrow S) while rotating the rotor of this turbine, so shaft 21 which rotates the rotor of compressor 20 which compresses the incoming air (arrow E); this compressed air is cooled in the cooling device 22 (for it has heated up during compression), which increases its specific weight.

In the embodiment of FIG. 10, the cooled compressed gas which leaves device 22 is again compressed in a second geared compression device 27 to ensure the scavenging of the transfer conduit at low powers.

In the embodiment of FIG. 11, the invention is applied to low compression ratio supercharged engines known in the art by the name "Hyperbar engines" and described for example in French Pat. No. 2,179,310 filed on Apr. 6, 1972 and its first certificate of addition No. 2,222,537 filed on Mar. 21, 1973 (and in the corresponding counterpart U.S. Pat. Nos. 3,988,894, 4,125,999 and 4,233,815).

There is provided between the intake manifold 11 and the exhaust manifold 12 a flame tube 28 in which a part of the compressed air leaving turbine 20 burns fuel while releasing at 29 hot burnt gases which are mixed at 30 with burnt gases arriving in the direction of arrow s. A flame tube serves essentially for starting up and at low speeds. It may be of the kind described in French Pat. No. 2,253,389 filed on Dec. 4, 1973 (and in the corresponding counterpart U.S. Pat. No. 4,004,414). A fresh compressed air by-pass 31 (closable by means of a valve 32) is also provided according to the above-mentioned patent which explains the operation of the unit illustrated in FIG. 11.

In FIG. 12, finally, there is shown a diagram which corresponds to an engine conventially supercharged by means of a turbocompressor driven by the exhaust gases, the power W (in kilowatts) being shown as abscissa and the absolute pressure P (in bars) being shown as ordinates, on the one hand, at the intake manifold 11 (curve $P_2$) and, on the other hand, at the exhaust manifold 12 (curve $P_3$), It can be seen that these curves $P_2$ and $P_3$ intersect at point A. For powers less than a (abscissa of point A), the pressure in the conduit of intake manifold 11 is less than the pressure in the conduit of exhaust manifold 12, which would produce a counter-scavenging instead of the scavenging desired.

With the unit shown in FIG. 11, this is avoided owing to the presence of flame tube 25, the outgoing gases of which rotate turbine 21 which in its turn drives compressor 22, resulting in an increase of pressure $P_2$ so that this latter exceeds $P_3$. It is known that in conventional two-stroke engines a coupled compressor is provided which comes into operation, if required, when $P_2$ is less than $P_3$.

On the contrary in the case of operation under normal running conditions, i.e. when power W is greater than a, pressure $P_2$ in the intake manifold is greater than pressure $P_3$ in the exhaust manifold, which allows scavenging to take place. It is precisely this scavenging pressure which achieves, in the device of FIG. 11, the rapid discharge of the burnt gases present in transfer conduit 13 during the whole of the period when the exhaust and intake valves are closed. It is the difference of pressure shown by arrow X directed upwardly (in FIG. 12) which is used for scavenging conduit 13.

In the absence of the flame tube of FIG. 11 or of a coupled compressor, the pressure difference $X_1$ directed upwardly in FIG. 12 would produce a counter-scavenging of transfer tube 13 from exhaust manifold 12 towards intake manifold 11. It is possible to prevent this counter scavenging in four-stroke engines by providing a valve (illustrated at 33 by a dash line in FIG. 5) which is closed for starting up and during the whole period of operation when curve $P_3$ is below curve $P_2$ (for a power W less than a).

In some cases the transfer conduit may be scavenged by the return wave formed by the blast wave which has been reflected at the intake aperture and which pushes back towards the exhaust manifold the burnt gases which have just penetrated into said conduit. Such an engine may then operate without any external air supply system.

The invention has been described up to now in the case of an internal combustion engine, of the so-called diesel type or of the so-called explosion type, with pistons reciprocating in a cylinder, the cycle being two- or four-stroke. It also applies to rotary engines in which a work chamber plays the role of the cylinder. In the claims which follow, by work chamber is meant the chamber of a rotary engine or the cylinder of a reciprocating piston engine.

Thus it can be seen that the invention allows the supersonic blast to be used which is normally produced in an internal combustion engine when an exhaust valve or port opens, this blast being due to the pressure difference which reigns at that moment between the inside of the cylinder and the exhaust pipe.

In accordance with the invention, this blast is used to accelerate the intake, in the same cylinder or in another cylinder, of scavenging air which is first of all compressed (before the opening of the intake valve or ports), then accelerated (after opening of this valve or these ports) towards the same cylinder or another cylinder, while ensuring a more rapid and a better scavenging of the cylinder in which it penetrates. Furthermore, the invention eliminates, or at least considerably reduces, the exhaust noise which is produced during the opening of the exhaust valves or ports.

These objects are reached due to a very simple structure only comprising fixed elements, contrary to the solution provided by the Comprex process, these fixed elements being few in number, i.e. a transfer conduit and channels provided between this conduit and the intake and exhaust manifolds. In most cases, a considerable reduction in the specific consumption of the engine is fully obtained.

It will be noted that the intake and the exhaust passages are designed to reduce to a minimum the radiation, towards the intake and exhaust manifold, of the blast wave which appears on the opening of the exhaust valve of a chamber and follows said transfer conduit.

In the case where the engine comprises an air supply system, the flow permeability from the intake manifold to the exhaust manifold, successively through the intake passage, the conduit and the exhaust passage in series, allows, in operation, practically the whole of the burnt gases to be discharged towards the exhaust manifold, under the effect of the air delivered by the air supply system.

In the case where the engine does not comprise any external air supply system, the flow permeability from the intake manifold towards the exhaust manifold, successively through said intake passage, the conduit and the exhaust passage in series allows, in operation, practically the whole of the burnt gases to be discharged towards the exhaust manifold, under the effect of the return wave resulting from the blast wave, which appears when the exhaust valve of a chamber opens and follows the transfer conduit, and which is reflected back at the intake aperture putting the chamber in communication with the intake pipe.

As is evident and as it follows moreover already from what has gone before, the invention is in no wise limited to those of its modes of application and embodiments which have been more specially considered; it embraces, on the contrary, all variations thereof.

I claim:

1. In a supercharged internal combustion engine, comprising:
    a number n of work chambers, particularly n cylinders, n being an integer at least equal to two, with n intake pipes, for the intake of at least air under pressure into each work chamber, means for providing fuel to each of said work chambers, and n exhaust pipes for discharge of burnt gases outside each work chamber and an associated blast wave produced by a combustion explosion occurring therein,
    a common intake manifold for the n work chambers of the engine for admitting air under pressure in said engine, and
    a common exhaust manifold for the n work chambers of the engine for discharging the burnt gases outside the engine,
    a turbine receiving the burnt gases from said common exhaust manifold and,
    a compressor driven by said turbine fed by atmospheric air and delivering air under pressure to said common intake manifold,
    the improvement consisting in providing said engine with a number n of transfer conduits,
    each conduit connecting directly an associated one of said exhaust pipes to an associated one of said intake pipes, each one of said n exhaust pipes being connected to one of said n intake pipes of a different work chamber, and the volume of each one of said n transfer conduits being at least equal to that of the associated work chambers connected thereto, and including n pairs of passages, each pair of passages putting in permanent communication each of said n transfer conduits with each of said intake and exhaust manifolds such that an exhaust passage of each pair is disposed in vicinity of an associated one of said exhaust pipes and an intake passage of each pair is disposed in vicinity of an associated one of said intake pipes, flow permeability from the intake manifold to the exhaust manifold being successively in series through each of said intake passages, the corresponding transfer conduit and the corresponding exhaust passage allowing in operation the substantially complete discharge towards the exhaust manifold of the burnt gases produced during a preceding cycle in the work chamber associated with said last mentioned exhaust passage and forced into said last mentioned transfer conduit from the exhaust pipe of such associated chamber and the replacement of these gases by at least air under pressure coming from the intake manifold during a period of the engine operating cycle during which said exhaust pipe of such associated chamber and said intake pipe of such associated chamber are each substantially isolated from such associated chamber
    wherein said passages are designed to reduce to a minimum the radiation, towards the intake and exhaust manifolds, of the blast wave which appears during the opening of the exhaust valve of said chamber and follows said transfer conduit, and wherein said respective passages comprise opening means communicating an inside of such associated conduits with an inside of the corresponding manifold through which said associated conduit passes, the opening means of said exhaust passages having a section less than that of the opening means of said intake passages.

2. The engine as claimed in claim 1 wherein each of said conduits has, at least over the greatest part of its length, a constant section, substantially equal to that of said associated one of said exhaust pipes.

3. The engine as claimed in claim 1 wherein said opening means of the passages are formed by holes provided in the wall of the associated ones of said transfer conduits and communicating the inside of such associated conduits with the inside of the corresponding manifold through which such associated conduit passes, the holes for the exhaust passages having a section less than that of the holes for the intake passages.

4. The engine as claimed in claim 1 wherein said compressor comprises an air supply system for said engine, and said flow permeability allows, in operation, substantially the whole of the burnt gases to be discharged towards the exhaust manifold, under the effect of the air delivered by said air supply system.

5. The engine as claimed in claim 1 wherein said opening means of at least the intake passages, are formed by holes provided in the wall of the associated one of said transfer conduits and communicating the inside of such associated conduits with the inside of the corresponding manifold through which said associated conduit passes.

6. The engine as claimed in claims 5, 4 or 1 further including bypass passageway means directly communicating an outlet of said compressor with an inlet of said turbine in parallel airflow relation with said engine work chambers, said bypass passageway means having an airflow capacity such that a substantially constant total airflow capacity is established between the compressor outlet and the turbine inlet for any given compressor outlet pressure adequate to automatically responsively compensate for the variations in the airflow capacity of the engine work chamber system caused by engine r.p.m. and load variations whereby any pressure difference between the compressor outlet and turbine inlet is generally independent of a ratio of flow rate of air traversing said bypass passageway to total airflow delivered from said compressor; said turbine and compressor being matched to the total airflow capacity of said engine work chamber system and of said bypass passageway means such that a plot of a ratio of compressor output pressure to compressor input pressure versus the airflow delivered by the compressor, during self-sustaining operation of said turbine and compressor and conjoint operation of the engine under its own power in response to any variation in engine load and r.p.m. within full operating range of the engine, lies at least within a narrow area approximating a predetermined curve located in a high yield area generally near to, but which does not exceed, a surge line characteristic of the compressor, and means for operating the engine under its own power and simultaneously operating said turbine and compressor in a self-sustaining mode so as to deliver air from said compressor to said engine work chambers and to said bypass passageway means such that the aforementioned plot of the matched turbine and compressor lies within said narrow area.

7. The engine as claimed in claim 6 wherein, said bypass passageway means includes means for controlling flow characteristics of said bypass passageway means so as to cause a pressure drop in air passing through the said bypass which is an increasing function of the pressure existing at the compressor outlet.

8. The engine as claimed in claim 7 including means for heating the gases before entering the turbine inlet by burning of fuel in an air stream delivered from the compressor outlet and downstream thereof and separately from the burning of fuel in said engine.

9. The engine as claimed in claim 8 wherein said flow controlling means comprises automatic throttle means operable in said bypass passageway means to effect a variable passage cross section therein and arranged so as to be traversed by the air passing through the bypass passageway means for automatically generating the bypass pressure drop which is an increasing function of pressure existing upstream thereof and which pressure drop is approximately independent of an flow-rate traversing said throttle means.

* * * * *